United States Patent [19]
Freadman

[11] Patent Number: 5,818,942
[45] Date of Patent: Oct. 6, 1998

[54] MULTIMEDIA STEREO SOUND SOURCE

[76] Inventor: Tommyca Freadman, 16 Glen Dr., Goshen, N.Y. 10924

[21] Appl. No.: 764,306

[22] Filed: Dec. 12, 1996

Related U.S. Application Data

[63] Continuation of Ser. No. 333,274, Nov. 2, 1994, abandoned.
[51] Int. Cl.⁶ ........................................................ H04R 5/02
[52] U.S. Cl. ............................. 381/24; 381/154; 181/145; 181/199
[58] Field of Search ................................... 381/24, 17, 86, 381/87, 88, 89, 90, 153, 159, 154, 188, 205; 181/145, 144, 199, 148, 153, 184, 189

[56] References Cited

U.S. PATENT DOCUMENTS 4,213,515  7/1980  Laupman et al. ...................... 181/156
5,400,408  3/1995  Lundgren et al. ...................... 381/159

FOREIGN PATENT DOCUMENTS 6341102  8/1989  Japan ........................................ 381/24

*Primary Examiner*—Forester W. Isen
*Attorney, Agent, or Firm*—Graham & James LLP

[57] ABSTRACT

A speaker enclosure providing improved stereo base response and directionality for multimedia computer applications is disclosed. The enclosure directs low end frequencies into a mixing chamber which directs these frequencies out through a central exit port, thereby providing clearer base response without sacrificing psychoacoustic directionality.

10 Claims, 3 Drawing Sheets

5,818,942

MULTIMEDIA STEREO SOUND SOURCE

This is a continuation of Ser. No. 08/333,274, filed on Nov. 2, 1994, now abandoned.

BACKGROUND OF THE INVENTION

1. Field of the Invention

The present invention is directed to computer output devices. More particularly the present invention is directed to providing stereo audio for multimedia workstations.

2. Discussion of Related Art

Personal computers require only rudimentary speaker devices for tasks such as wordprocessing where sound is used as the auditory equivalent of dashboard warning light. The transducers producing such beeps and whistles, because they only produce sounds at the upper end of the auditory spectrum, are by nature quite compact and inexpensive. However, they are not capable of reproducing complex sounds, or pitches beyond a limited frequency range. Multimedia presentations require high quality voice reproduction as well as the ability to accurately reproduce other types of complex audio material.

Moreover, in applications such as video conferencing, accurate stereo reproduction of the acoustic space being shown on the computer screen provides important non-verbal cues and, from minute to minute, helps the listener identify which person shown on the video monitor is speaking as the conversation progresses.

Thus, it is highly desirable to provide consumer computer workstations for multimedia program material that are as compact and inexpensive as the conventional personal computers but still provide accurate stereo separation and high-fidelity sound reproduction.

SUMMARY OF THE INVENTION

In accordance with the present invention a stereo sound source for a computer workstation has first and second speaker cavities with respective bass ports. A cylindrical sound guide having first and second ends is connected at the first end to a bass port of a respective speaker cavity and on the other end the guides are connected to a respective mixing chamber cavity connected by an exit port to ambient air.

DESCRIPTION OF THE DRAWINGS

The features and advantages of the present invention will be better understood when the detailed description of the preferred embodiments is given below is considered in conjunction with the drawing wherein.

In these drawings, like structures have like reference numerals.

DETAILED DESCRIPTION OF THE PREFERRED EMBODIMENTS

Figure 1:
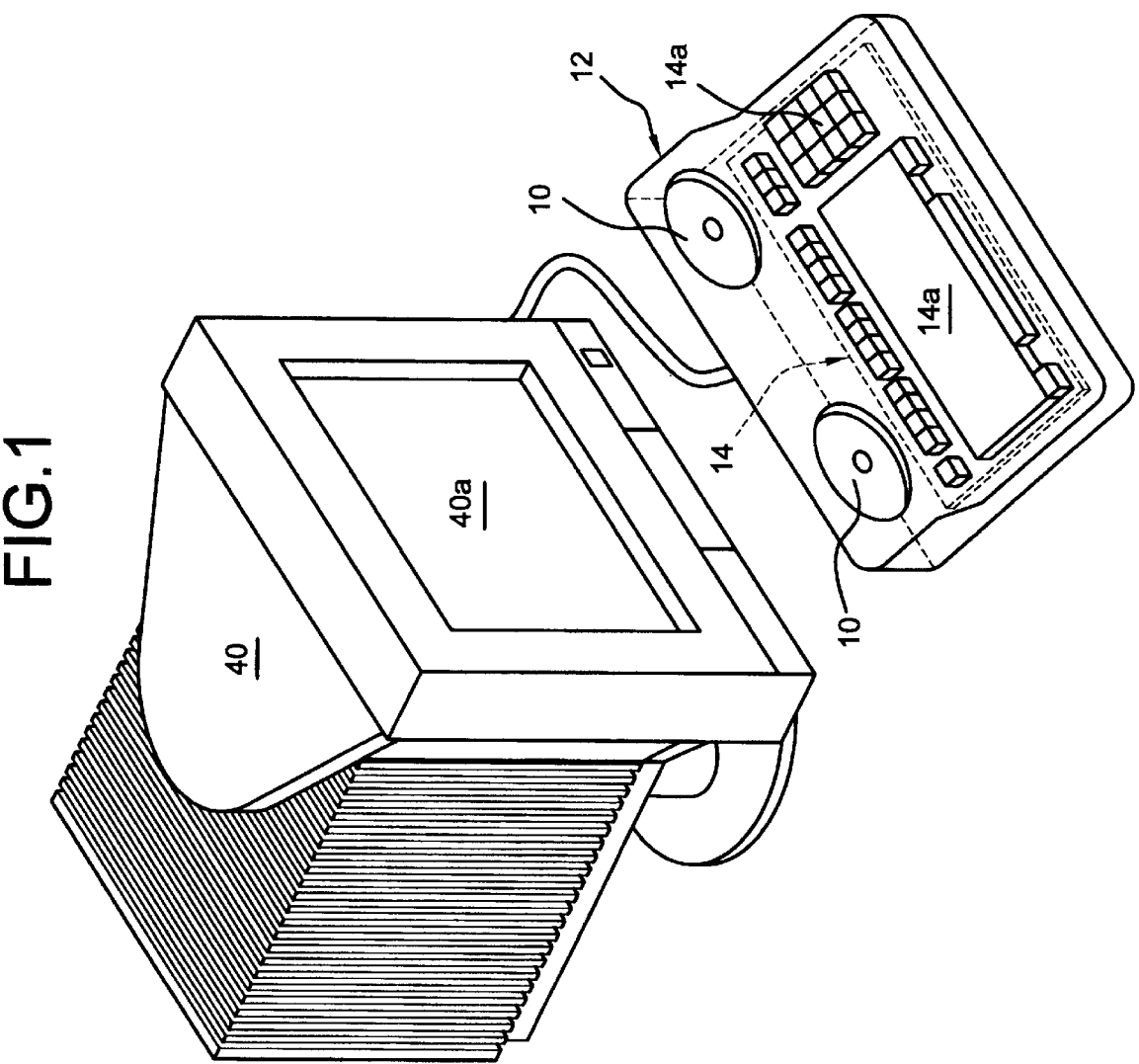
FIG. 1 shows a prior art stereo sound source with the speaker grills removed and interior detail shown in phantom.

One way of providing stereo audio for consumer multimedia workstations is to mount speakers 10 in openings at either end of the top rear edge of the keyboard shell 12, as shown in FIG. 1. Speakers thus mounted in the top surface of a conventional keyboard shell share a partially-enclosed flat plastic tray that tapers from a half inch to one or two inches in thickness with an assortment of wires, cables and key-switch circuit boards 14. This enclosure is ported to the outside wherever the keyboard has keys 14a. Thus, the keyboard shell can provide no resonance: only the raw, direct speaker sound is projected. Unfortunately, the largest speakers that can be accommodated in such a keyboard shell produce poor direct sound quality. They are too small to provide good sound reproduction in the mid-range band of frequencies, and provide virtually none in the lower ranges of the sound spectrum. Also, because of the shell's irregular, thin profile, and the numerous mechanical key structures in this enclosure, rattles, buzzes and false resonances may be produced within the shell 12.

Figure 2:
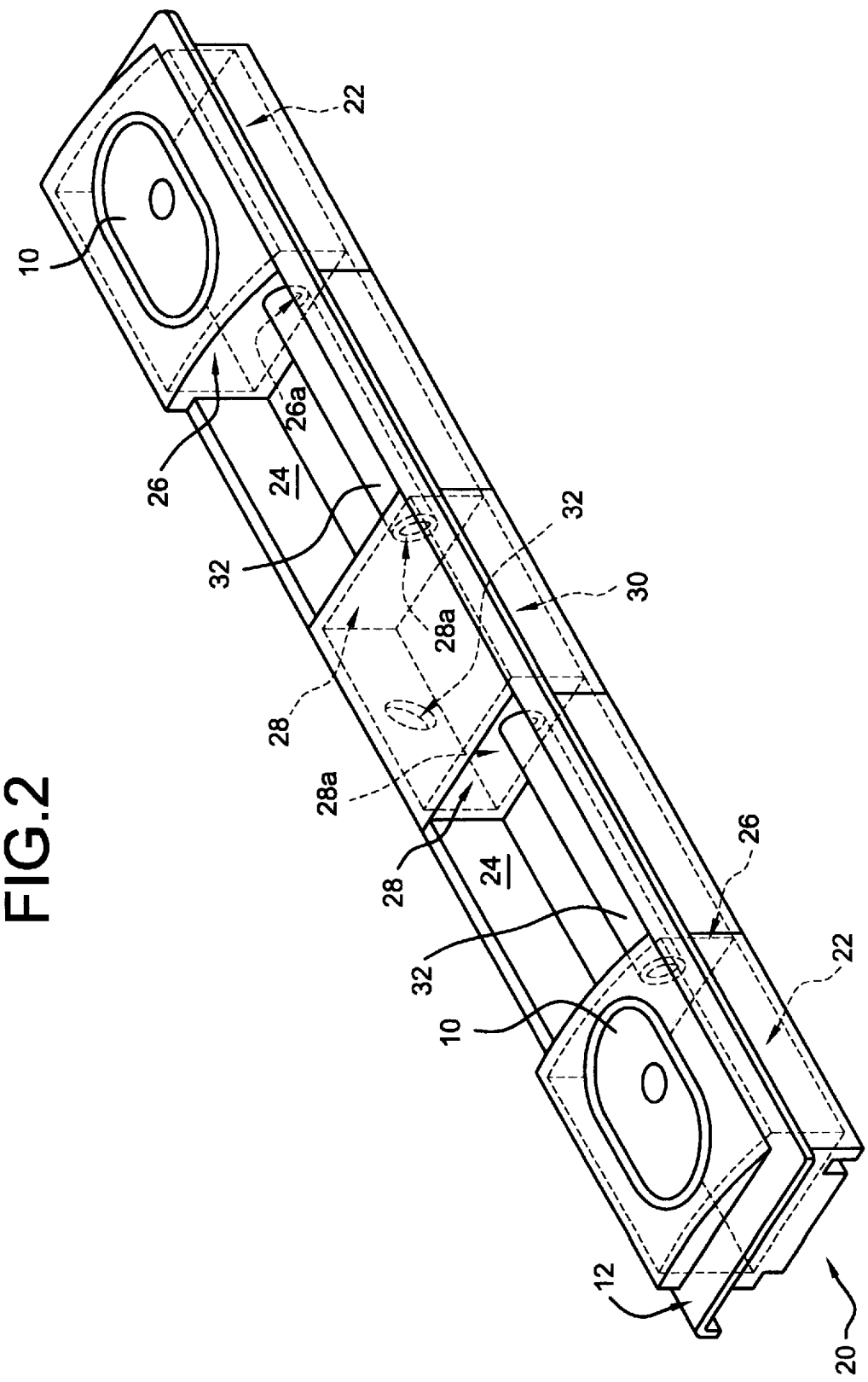
FIG. 2 shows a partially cutaway view of an improved stereo sound source in accordance with the present invention, with the speaker grills removed and interior detail shown in phantom.

In accordance with the present invention, an enclosed unit 20 is formed at the top rear edge of the keyboard shell 12 as shown in FIG. 2. The unit 20 is divided into five sections. The first two sections are speaker cavities 22 in which the speakers 10 are mounted. The next two sections are barrier sections 24 separated from the speaker cavities 22 by barrier walls 26. Junction walls 28 at the opposite end of each barrier section 24 define a mixer section 30 that connects the two ends of resonator unit 20.

The air volume in each speaker cavity 22 is connected to the air volume in the mixer section 30 by a hollow tube 32 through openings 26a, 28a in the barrier wall 26 and the junctions walls 28. This sound then exits the mixer section 30 through a bass port 34 in the back wall of the keyboard 12, toward the monitor unit 40.

Figure 3:
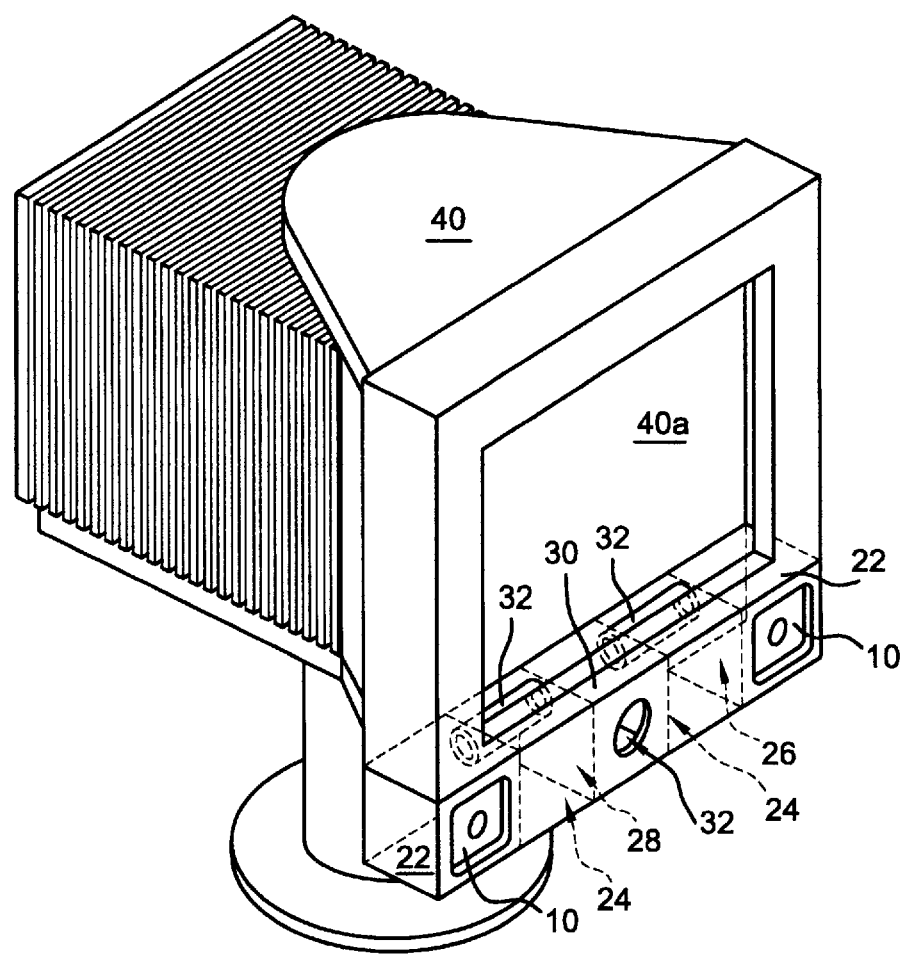
FIG. 3 shows an improved video monitor sound unit in accordance with the present invention mounted on a conventional workstation monitor unit.

FIG. 3 shows a stereo sound source in accordance with the present invention mounted under the viewing screen opening 40a of a conventional computer monitor 40. In this embodiment, the bass port 34 is mounted on the front surface of the enclosed unit 20 between the openings for the speakers 10 so as to project sound toward the viewer from the direction of the screen. This provides increased acoustic realism because of the perceived proximity of the sound sources to each other and the video display.

It will be apparent to one skilled in the art that modifications and variations of the disclosed embodiments are possible within the spirit and scope of this invention which is defined by the claims appended below.

I claim:

1. A stereo sound source for a multimedia workstation, comprising:
   a housing including a plurality of walls defining an interior of the housing;
   first and second speaker cavities located within the interior of the housing;
   a mixing chamber located within the interior of the housing and having first and second junction walls being separate from the plurality of walls of the housing, said mixing chamber having an exit port extending through one of the walls of the housing to an outside of the housing; and
   a sound guide located within the interior of the housing and connected to each of said first and second junction walls and to each of said first and second speaker cavities, said sound guide being physically separate from the walls of the housing and acoustically isolated from a chamber defined by the walls of the housing, said sound guide extending between said mixing chamber and said first speaker cavity and between said mixing chamber and said second speaker cavity to transmit sound directly from each of said first and second speaker cavities to the mixing chamber, respectively, so that lower frequencies produced by each of said first and second speaker cavities are conducted to the mixing chamber and out through the exit port.

2. A stereo sound source for a multimedia workstation, comprising:

a housing including a plurality of walls defining an interior of the housing;

first and second speaker cavities each having an air volume and each being disposed within the interior of the housing;

a mixing chamber located within the interior of the housing and having first and second junction walls, said mixing chamber having an exit port extending through one of the walls of the housing to an outside of the housing; and a sound guide located within the interior of the housing and connected to the opening formed in each of said first and second junction walls and to each of said first and second speaker cavities, said sound guide being physically spaced from the walls of the housing and acoustically isolated from a chamber defined by the walls of the housing, said sound guide extending between said mixing chamber and said first speaker cavity and between said mixing chamber and said second speaker cavity to provide a direct fluid connection between the air volume in each speaker cavity and the air volume in the mixing chamber, respectively, so that lower frequencies produced by each speaker are conducted to the mixing chamber and out through the exit port.

3. The sound source of claim 1 wherein said exit port is on a portion of a keyboard facing away from the operator of the keyboard.

4. The sound source of claim 1 wherein said exit port is on a portion of a monitor below the monitor screen and facing toward persons viewing the monitor screen.

5. The sound source of claim 1 wherein said sound guide provides an acoustic connection through a barrier chamber decoupling a speaker cavity from said mixing chamber.

6. The sound source of claim 2 wherein said sound guide provides an acoustic connection through a barrier air volume decoupling a speaker cavity from said mixing chamber.

7. The sound source of claim 1 wherein said sound guide is connected to an opening on a barrier wall of a respective speaker cavity so that said lower frequencies are conducted to said mixing chamber.

8. The sound source of claim 2 wherein said sound guide is connected to an opening on a barrier wall of a respective speaker cavity so that said lower frequencies are conducted to said mixing chamber.

9. The sound source of claim 1 wherein said sound guide is a tube.

10. The sound source of claim 2 wherein said sound guide is a tube.

* * * * *